(No Model.)
C. L. JENSEN.
COMBINED CLOD CRUSHER AND LAND ROLLER.
No. 382,612. Patented May 8, 1888.
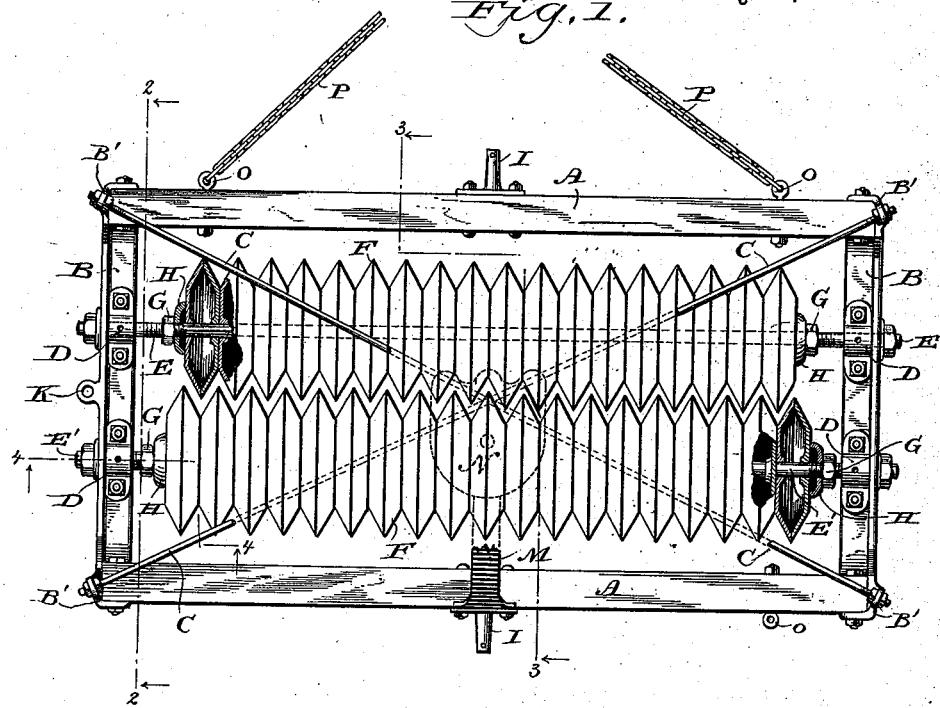
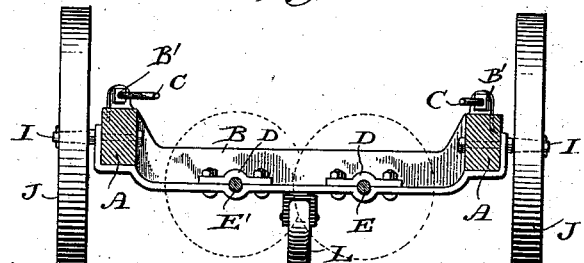
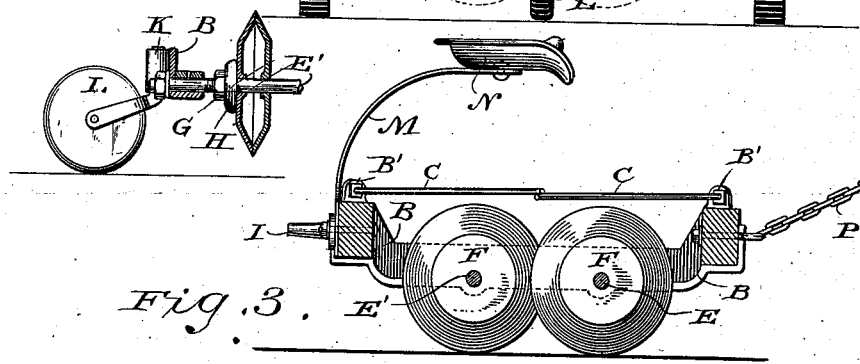
Witnesses.
Geo. W. Young.
N. E. Oliphant
Inventor.
C. Louis Jensen
By Stout & Underwood
Attorneys.

UNITED STATES PATENT OFFICE.

C. LOUIS JENSEN, OF MILWAUKEE, WISCONSIN.

COMBINED CLOD-CRUSHER AND LAND-ROLLER.

SPECIFICATION forming part of Letters Patent No. 382,612, dated May 8, 1888.

Application filed December 27, 1887. Serial No. 258,984. (No model.)

*To all whom it may concern:*

Be it known that I, C. LOUIS JENSEN, of Milwaukee, in the county of Milwaukee, and in the State of Wisconsin, have invented certain new and useful Improvements in Combined Clod-Crushers and Land-Rollers; and I do hereby declare that the following is a full, clear, and exact description thereof.

My invention relates to a combined clod-crusher and land-roller; and it consists in certain peculiarities of construction and combination of parts, to be hereinafter described with reference to the accompanying drawings, and subsequently claimed.

In the drawings, Figure 1 represents a plan view of my invention; Figs. 2, 3, and 4, sectional views respectively taken on the lines 2 2, 3 3, and 4 4, Fig. 1.

Referring by letter to the drawings, A A represent two parallel beams united at their ends by angular castings B B to form the frame of my device, and this frame is strengthened by braces C, that cross each other and are secured to ears B' on said castings.

Journaled in bearings D on the castings B are parallel shafts E E', and arranged on each of these shafts is a series of hollow disks, F, beveled on each side the center of their peripheries, the disks on one shaft intermeshing with those on the other; and while I have shown but two shafts it is obvious that a greater number may be employed, if found more desirable. By having the disks F made hollow I economize material and reduce the weight of my device.

The shafts E E', immediately adjacent to the inner sides of the castings B, are screw-threaded to receive nuts G, that impinge against washers H, and these washers in turn bear against the outermost disks F on said shafts. By means of the nuts G all the disks F on any one of the shafts can be held close against one another or given a certain amount of lateral play, according to the preference of the operator. The nuts G being screwed up, the independent rotation of the disks F is prevented, or, in other words, I make what is practically a solid roller; but when the nuts are loosened said disks have a rotation independent of their shafts, the latter being of advantage in making short turns.

Each of the beams A has secured thereto a stud, I, for a detachable wheel, J, and one of the castings B is provided with an eye, K, for the shank of a caster-wheel, L. To the rear beam of the frame I attach a spring, M, that has pivoted to its free end a seat, N, and both the beams are provided with eyebolts O for engagement with draft-chains P.

In moving my device from one place to another the frame is mounted on the wheels J J L, the draft-chains P hooked in the eyebolts O at one end of said frame, and the seat N turned on its pivot to face in the direction of the draft. When the frame is mounted as above described, the disks F are free of the ground, as shown by dotted lines, Fig. 2. When the wheels J J L are detached from the frame and the draft-chains attached to the front beam thereof, the disks F are on the ground and my device ready for operation.

The disks F on the front shaft, E, crush the clods over which they pass, and, being beveled on each side the center of their peripheries, will press the earth up in ridges, so as to come in the path of the disks on the rear shaft, E'. The action of the disks on the last-named shaft will still further disintegrate the clods, and the action of both sets of disks is such as to thoroughly pulverize the ground on which they act, and finally leave the earth laid up in ridges, so that such water as may collect on the field will drain off easily, and in case of a freeze any water that may remain will form ice in the trenches between the ridges and below the tops of the latter, and hence the seed in said ridges is not as liable to injury as is the case when the ground is not ridged.

When a field is cross-harrowed by my device, the earth will stand in small cone shaped hills, and hence there will be better drainage and less liability of the seed in the hills being frozen.

Having thus described my invention, what I claim as new, and desire to secure by Letters Patent, is—

1. The combination of a frame comprising the parallel beams A, provided with the studs I, and the angular castings B, uniting the beams, and one of these castings provided with an eye, the shafts E E', journaled in the frame, the disks F, arranged on the shafts, the wheels J, for engagement with the studs on said beams, and the caster-wheel L, having its shank adapted to fit the eye K on the casting above named, substantially as set forth.

2. The combination of a frame comprising the parallel beams A, castings B, uniting the ends of the beams and provided with ears B', the braces C, that cross each other and are connected at their ends to the ears on said castings, the shafts E E', journaled in the frame, and the disks F, arranged on the shaft, substantially as set forth.

In testimony that I claim the foregoing I have hereunto set my hand, at Milwaukee, in the county of Milwaukee and State of Wisconsin, in the presence of two witnesses.

C. LOUIS JENSEN.

Witnesses:
  N. E. OLIPHANT,
  H. G. UNDERWOOD.